US010713651B2

(12) United States Patent
Vaidyanathan et al.

(10) Patent No.: US 10,713,651 B2
(45) Date of Patent: Jul. 14, 2020

(54) SHARED RESOURCE MANAGEMENT SYSTEM

(71) Applicant: PAYPAL, INC., San Jose, CA (US)

(72) Inventors: Sathish Vaidyanathan, Chennai (IN); Nikant Vohra, Chennai (IN); Aditya Bharadwaj, Chennai (IN); Akshay Goel, Chennai (IN)

(73) Assignee: PayPal, Inc., San Jose, CA (US)

( * ) Notice: Subject to any disclaimer, the term of this patent is extended or adjusted under 35 U.S.C. 154(b) by 593 days.

(21) Appl. No.: 15/447,036

(22) Filed: Mar. 1, 2017

(65) Prior Publication Data

US 2017/0243200 A1   Aug. 24, 2017

Related U.S. Application Data

(63) Continuation of application No. 14/231,193, filed on Mar. 31, 2014, now abandoned.

(51) Int. Cl.
*G06Q 40/00* (2012.01)
*G06Q 20/36* (2012.01)
*G06Q 20/40* (2012.01)

(52) U.S. Cl.
CPC ....... *G06Q 20/363* (2013.01); *G06Q 20/3672* (2013.01); *G06Q 20/405* (2013.01)

(58) Field of Classification Search
USPC ........................................................ 705/42
See application file for complete search history.

(56) References Cited

U.S. PATENT DOCUMENTS

2007/0295803 A1   12/2007   Levine et al.
2009/0144161 A1   6/2009   Fisher
(Continued)

FOREIGN PATENT DOCUMENTS

WO   WO 2013/095486   6/2013

OTHER PUBLICATIONS

A Ubiquitous NFC Solution for the Development of Tailored Marketing Strategies Based on Discount Vouchers and Loyalty Cards Borrego-Jaraba, Francisco; Sensors; Basel vol. 13, Iss. 5, (2013): 6334-6354. https://search.proquest.com/docview/1537648859/11CAE44F33454A83PQ/3?accountid=14753.*

(Continued)

*Primary Examiner* — Hani M Kazimi
*Assistant Examiner* — Hatem M Ali
(74) *Attorney, Agent, or Firm* — Haynes and Boone, LLP (57) ABSTRACT

A method for a shared resource management system is discussed. The method includes managing a shareable digital artifact for sharing between applications hosted by a user devices. The shared artifact is accessible, at the same time, by first and second application. The use of the shared artifact by the first application makes the shared artifact unavailable for use by the second application. The method includes determining whether a notification is received from the first application indicating that the shared artifact is used by the first application at a merchant. The method includes, in response to a determination that the notification is received, marking the shared artifact used. In response to marking the shared artifact used, a used artifact notification is sent to the second application to indicate that the shared artifact has been used and it is unavailable for use by the second application.

20 Claims, 7 Drawing Sheets

(56) References Cited

U.S. PATENT DOCUMENTS

2013/0151360 A1* 6/2013 Scipioni ............ G06Q 20/3672
                                                        705/21
2013/0325567 A1   12/2013 Bradley et al.
2013/0332337 A1   12/2013 Tran
2014/0214640 A1*  7/2014 Mallikarjunan ....... G06Q 20/36
                                                        705/35

OTHER PUBLICATIONS

How do you split coupons when paying a restaurant bill? https://mindyourdecisions.com/blog/2011/02/28/how-to-split-coupons-when-paying-a-restaurant-bill/ ;Posted Feb. 28, 2011 by Presh Talwalkar. (Year: 2011).*

Redeem a gift card, gift code or promotional code; https://support.google.com/google play/answer/3422659?hl=en-GB Niv. 8, 2013 (Year: 2013).*

* cited by examiner

SHARED RESOURCE MANAGEMENT SYSTEM

CROSS REFERENCED TO RELATED APPLICATIONS

This continuation patent application claims priority to and the benefit of U.S. patent application Ser. No. 14/231,193, filed Mar. 31, 2014, the contents of which are incorporated by reference in its entirety.

BACKGROUND

Embodiments of the present disclosure generally relate to mobile or digital wallets, and more particularly, to methods and systems for sharing mobile or digital wallets between multiple users.

Mobile electronic computer devices such as smartphones and tablet computers are being increasingly used as mobile or digital wallets. For example, they can be used to conduct transactions online or offline such as making payments at physical store locations. Users may prefer to use mobile or digital wallets for conducting transactions because they may prefer to leave their traditional physical wallets at home. As such, mobile or digital wallets may offer greater convenience and simplicity for the users.

Many companies have developed their own versions of digital wallets such as Square™, Google Wallet™, Apple PassBook™, Lemon Wallet™ and the like. While existing digital wallets may have been generally adequate for their intended purposes, they have not been entirely satisfactory in every aspect. For example, today, there may be a lot of friction among users in adopting a digital wallet at least in part because there may not be flexibility for managing the contents of the digital wallet such as credit cards, coupons, gift cards, etc. This lack of flexibility for managing the contents may lead to, for example, potentially leaving gift cards or coupons unredeemed and wasted. As such, there is a need in the art to offer a digital wallet system and method that may provide consumers with flexibility for managing the contents of their digital wallets, which may lead to increased usage of the digital wallets.

BRIEF DESCRIPTION OF THE DRAWINGS

FIG. 3A, which includes FIGS. 3A-1 and 3A-2, is a diagram illustrating a use case flow from a perspective of a first user device for sharing an artifact of a digital wallet according to an embodiment of the present disclosure.

DETAILED DESCRIPTION

It is to be understood that the following disclosure provides many different embodiments or examples for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

According to one or more embodiments of the present disclosure, users of mobile or digital wallets may have flexibility to manage the contents or artifacts included in their digital wallets, which may lead to increased usage of their digital wallets. In that regard, embodiments herein may allow sharing of digital wallets between one user and another. Sharing may be across multiple users on different user devices.

In general, digital wallets may include a variety of artifacts such as credit cards, debit cards, offers, coupons, receipts, loyalty cards, membership cards, reward points, air miles, contacts, ID cards, reminders, photographs, bills, movie tickets, etc. In some instances, consumers or users of digital wallets may want to have the flexibility to manage their digital wallets, for example, users may want to share the artifacts included in their digital wallets with other digital wallet users. One or more embodiments may allow sharing of artifacts that exist in a digital wallet such as a PayPal Wallet™ among multiple users (e.g., PayPal™ users) of different user devices. In one example, a husband and wife may want to share their digital wallet so that both may view and/or use the artifacts included in the digital wallet such as store memberships, discount coupons, reward points, gift cards, contacts details, etc. In another example, friends may want to share artifacts such as movie tickets, gift cards, offers, etc. with each other.

Recent studies indicate that only a minimal percentage of coupons are ever used and that billions of dollars worth of gift cards go unredeemed. None of the existing digital wallet solutions today provide a feature for managing the artifacts included in a digital wallet such as sharing these artifacts. As a result, artifacts may be wasted, for example, when the artifacts go unused or expire, leading to a lot of waste of artifacts such as coupons, gift cards, reward points, etc. every year. For instance, a first user of a typical digital wallet may not be able to share a coupon with another digital wallet user. This may result in the coupon expiring and being wasted if the first user did not have a chance to use the coupon.

According to one or more embodiments of the present disclosure, methods and systems provide managing flexibility of a digital wallet including a sharing solution such that waste of artifacts may be reduced. A sharing platform according to embodiments herein may allow the users of digital wallets to share artifacts easily and securely. In various embodiments, sharing may occur at different levels, for example, the whole digital wallet may be shared in its entirety, or sharing may be restricted to certain categories or artifacts, or to certain individual artifacts within various categories. In addition, various permissions may be associated with sharing, for example, when sharing an artifact, permissions may be granted for viewing only, for viewing and using the artifact, for a specified duration or period of time, for a specified location, etc. Once an artifact is shared and used, methods and systems according to embodiments herein may notify every user including each user with whom the artifact was shared about the artifact's usage.

Advantageously, a sharing platform according to one or more embodiments may provide users or consumers with flexibility to manage their digital wallets' contents or artifacts, which may lead to increased use of digital wallets. The sharing platform may reduce wasted or unused artifacts such as coupons, reward points, gift cards, etc., which may benefit consumers as well as sellers or merchants. For example, consumers may benefit from the use of coupons or gift cards, which may otherwise go unused, and merchants may benefit from having more consumer traffic and potentially more sales.

Figure 1:
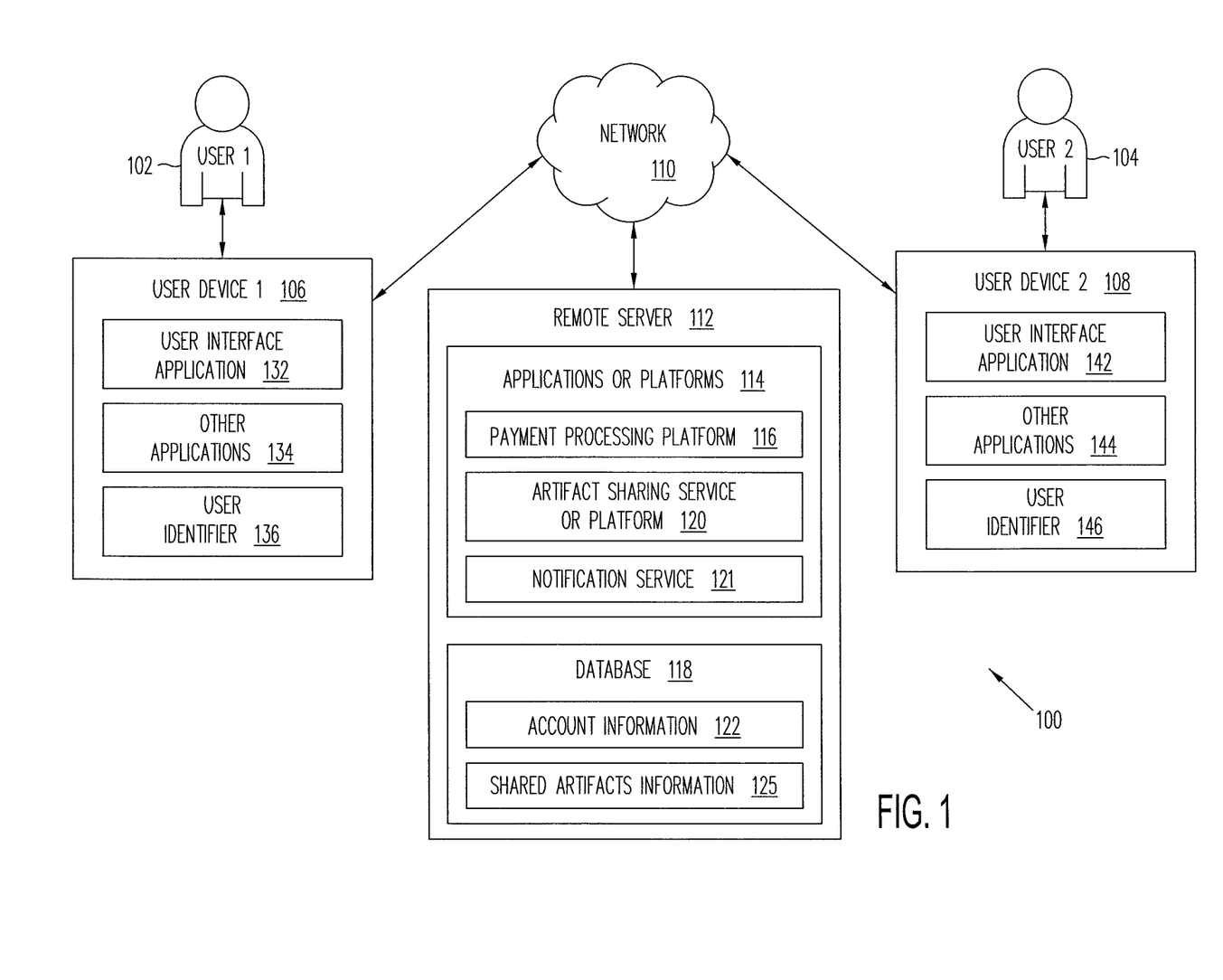
FIG. 1 is a block diagram illustrating a system for enabling sharing of contents or artifacts of a digital wallet according to an embodiment of the present disclosure.

Referring now to the drawings wherein the showings are for purposes of illustrating embodiments of the present disclosure only, and not for purposes of limiting the same, FIG. 1 is a block diagram illustrating a system for enabling sharing of contents or artifacts of a digital wallet according to an embodiment of the present disclosure.

FIG. 1 illustrates an embodiment of a system 100 adapted to enable sharing of contents or artifacts of digital wallets between a first user device 106 and a second user device 108 over a network 110. As shown in FIG. 1, the system 100 includes the first user device 106 (e.g., network computing device), which is associated with a first user 102, the second user device 108 (e.g., network computer device), which is associated with a second user 104, and a remote server or device 112 (e.g., network server device) in communication over the network 110.

User device 106 and user device 108 are configured to conduct electronic communications with external entities, for example the remote server 112. The electronic communications may take place over an electronic network such as network 110, which may include a wired network or a wireless network implemented according to a communications protocol now known or later developed. The network 110, in one embodiment, may be implemented as a single network or a combination of multiple networks. For example, in various embodiments, the network 110 may include the Internet and/or one or more intranets, landline networks, wireless networks, and/or other appropriate types of communication networks. In another example, the network 110 may comprise a wireless telecommunications network (e.g., cellular phone network) adapted to communicate with other communication networks, such as the Internet.

User device 106 and/or user device 108, in various embodiments, may be implemented using any appropriate combination of hardware and/or software configured for wired, wireless, or any other type of appropriate communication over the network 110. User 102 may be a person that is associated, for example, uses or owns the user device 106. Likewise, user 104 may be a person that is associated, for example, uses or owns the user device 108. In various examples, user device 106 and/or user device 108 may be implemented as an electronic mobile or wireless device (e.g., mobile computing device). User device 106 and/or user device 108 may include a mobile smart phone, for example an IPHONE®, an ANDROID® phone, a WINDOWS® phone, a BLACKBERRY® phone, or another suitable smartphone. In other embodiments, user device 106 and/or user device 108 may include a tablet computer (also referred to as a computer tablet). These may include an IPAD®, an ANDROID® tablet, a WINDOWS® tablet, a PLAYBOOK® tablet, or the like. In further embodiments, user device 106 and/or user device 108 may include a personal computer, a notebook computer, a wearable computing device such as GOOGLE® glasses or a smart watch, and/or various other generally known types of wired and/or wireless computing devices. User 102 and user 104 may electronically communicate with external entities (e.g., remote server 112) through their respective user devices 106 and 108.

User device 106 and user device 108, in one embodiment, may include a user interface application 132 or 142 respectively, which may be utilized by the respective user 102 and 104 to conduct financial transactions (e.g., shopping, purchasing, bidding, etc.) with the remote server 112 over the network 110. In one aspect, purchase expenses may be directly and/or automatically debited from an account related to the respective user 102 or 104 via the respective user interface application 132 or 142.

In one implementation, the user interface application 132 or 142 comprises a software program, such as a graphical user interface (GUI), executable by a processor that is configured to interface and communicate with the remote server 112 via the network 110. In another implementation, the user interface application 132 or 142 comprises a browser module that provides a network interface to browse information available over the network 110. For example, the user interface application 132 or 142 may be implemented, in part, as a web browser to view information available over the network 110. In another example, user 102 and/or user 104 are able to access merchant websites to view and select applications, products, and/or services ("items") for purchase, and the user 102 and/or user 104 are able to conduct financial transactions (e.g., purchase and provide payment for items) from one or more merchant websites or servers via the remote server 112. Furthermore, user 102 and/or user 104 may receive various marketing materials such as promotions, coupons, gift cards, offers, etc. from the one or more merchant websites or servers.

User device 106 and user device 108, in various embodiments, may include other applications 134 and 144, respectively, as may be desired in one or more embodiments of the present disclosure to provide additional features available to the respective user 102 and 104. In one example, such other applications 134 and 144 may include security applications for implementing client-side security features, programmatic client applications for interfacing with appropriate application programming interfaces (APIs) over the network 110, and/or various other types of generally known programs and/or software applications. In still other examples, the other applications 134 and 144 may interface with the respective user interface application 132 and 142 for improved efficiency and convenience.

As such, user devices 106 and 108 may include a User Interface Application 132, 142 and/or Other Applications 134, 144 where applications may be loaded. One application that may be loaded is a mobile payment application wherein user device 106, 108 is adapted to be used as a mobile or digital wallet. From time to time, a user such as user 102 or user 104 may wish to use his or her respective user device as a digital or mobile wallet. In that regard, the user may use certain capabilities (e.g., Near Field Communications, RFID, IR, a scanner, or other type of communication) of the user device to conduct transactions such as to make payments at a physical business location.

According to one or more embodiments, the user interface application 132 and 142 or the other applications 134 and 144 may include an application that may be loaded on user device 106 and/or user device 108, respectively, by remote server 112 or by another appropriate third party server. Such application enables a user such as first user 102 to easily share contents or artifacts included in a digital wallet of user device 106 with a second user device 108 of user 104 over network 110 as will be described in more detail below according to one or more embodiments.

User device 106 and user device 108, in one embodiment, may include at least one user identifier 136 and 146, respectively, which may be implemented, for example, as operating system registry entries, cookies associated with the respective user interface application 132 and 142, identifiers associated with hardware of the respective user device 106 and 108, or various other appropriate identifiers. The user identifier 136 or 146 may include one or more attributes related to the respective user 102 or 104, such as personal information related to the respective user 102 or 104 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, the user identifier 136 and 146 may be passed with a user login request to the remote server 112 via the network 110, and the user identifier 136 and 146 may be used by the remote server 112 to associate the user 102 and user 104 with a particular user account that may be maintained by the remote server 112. For example, in various aspects, the user attributes may be passed to the remote server 112 as part of a login, selection, purchase, and/or payment request, and the user attributes may be utilized by the remote server 112 to associate the user 102 and/or the user 104 with one or more particular user accounts maintained by the remote server 112.

The remote server 112, in one embodiment, may be maintained by a service provider entity such as a transaction processing entity, which may provide processing for financial transactions and/or information transactions between the user 102 and the user 104. As such, the remote server 112 includes applications or platforms 114, which may be adapted to interact with each user device 106 and/or user device 108 over the network 110 to facilitate the sharing of contents or artifacts included in a digital wallet of a user device as well as the selection, purchase, and/or payment of items by the user 102 or user 104. In one example, the remote server 112 may be provided by PayPal™, Inc. and/or eBay™, Inc. of San Jose, Calif., USA.

Applications or platforms 114 may include a digital wallet artifact sharing service or platform 120, which may enable a first user such as user 102 to share contents or artifacts of a digital wallet of user device 106 with user device 108 associated with a second user 104. Applications or platforms 114 may also include a Notification Service 121, which may notify of usage of shared artifacts of a digital wallet as will be described in more detail below according to one or more embodiments. Also, applications or platforms 114, in one embodiment, may utilize a payment processing platform 116 to process purchases and/or payments for financial transactions for user 102 and/or user 104 with a merchant server.

The remote server 112, in one or more embodiments, may be configured to maintain a database 118 including one or more user accounts, each of which may include account information 122 associated with one or more individual users (e.g., user 102 and user 104). For example, account information 122 may include private financial information of each user 102 and/or 104, such as one or more account numbers, passwords, credit card information, banking information, or other types of financial information, which may be used to facilitate sharing of digital wallets as well as financial transactions between a first user such as user 102 and one or more other users such as user 104. In various aspects, the methods and systems described herein may be modified to accommodate users that may or may not be associated with at least one existing user account.

Database 118 of remote server 112 may include shared artifacts information 125, which may store information related to a user's account including digital wallet contents or artifacts shared between users. For example, information stored may include the type, quantity, usage, identification, time, location, etc. associated with the usage of a shared artifact of a digital wallet. It should be noted that the information in database 118 as discussed above is merely an example used to illustrate the type of information that may be stored in relation to various transactions or usage of digital wallets, for example. In a similar manner, other data or information may be stored for different types of transactions or activities involving the user device 106 and/or user device 108. It should be understood that in various embodiments, database 118 may be maintained by remote server 112 as illustrated, or by a different third party server as appropriate.

It should be noted that although this embodiment of FIG. 1 illustrates only two users, user 102 and user 104, embodiments of the present disclosure may be applicable for chain sharing. For example, when the first user 102 shares a digital wallet artifact via his or her user device 106 with the second user 104 via the second user's user device 108, the first user 102 may permit the second user 104 to re-share the artifact. That is, the second user 104 may be able to, in turn, share the artifact with a third user or more users. Also, in various embodiments, the first user 102 may share a digital wallet artifact via his or her user device 106 with multiple other users as well, not just with the second user 104.

Figure 2:
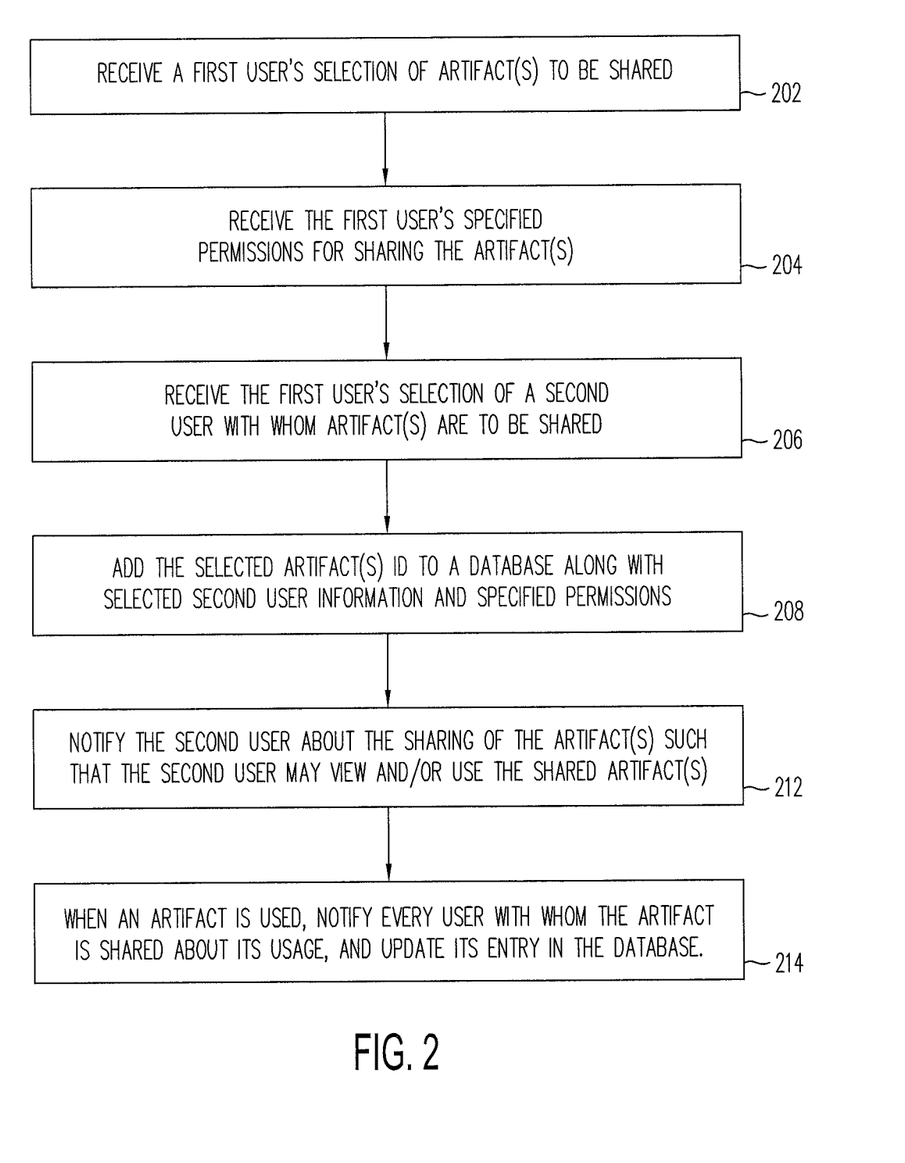
FIG. 2 is a flow diagram illustrating a method for sharing contents or artifacts of a digital wallet according to an embodiment of the present disclosure.

Referring now to FIG. 2, a flow diagram illustrates a method for sharing contents or artifacts of a digital wallet according to an embodiment of the present disclosure. The method illustrated in the embodiment of FIG. 2 may be implemented by the system illustrated in the embodiment of FIG. 1.

According to one or more embodiments, a first user (e.g., user 102 as illustrated in the embodiment of FIG. 1) may log into an application downloaded on his or her user device that may implement a method and system for enabling sharing of a digital wallet. In an embodiment, the user may log into a wallet or service provider application. In block 202, the system may receive a first user selection of one or more artifacts included in the digital wallet to be shared with another user or users. For example, referring to the embodiment of FIG. 1, user 102 may want to share an artifact (e.g., a coupon) from his digital wallet implemented on user device 106. In this regard, when user 102 wants to share an artifact, a request may be received by artifact sharing service or platform 120 of remote server 112.

In block 204, the system may receive any permissions specified by the first user for sharing the artifact(s). In various embodiments, sharing may occur at different levels, for example: 1) the whole digital wallet may be shared in its entirety, 2) sharing may be restricted to certain categories of artifacts, for example, membership cards, rewards cards, coupons, receipts, contacts, calling cards, etc., or 3) sharing may be restricted to certain individual artifacts within various categories, for example, a membership card for a certain merchant, coupons for a certain product in a store, etc. In addition, various permissions may be associated with sharing, for example, when sharing an artifact, permissions may be granted for viewing only, for viewing and using the artifact, for a specified duration or period of time, for a specified location, etc. The permissions may be given for specific other users (e.g., a spouse, a child, a sibling, a parent, a friend, etc.) and/or a specific group of users (e.g., children, immediate family members, extended family members, a specific group of friends, co-workers, or the like, etc.).

In an example, the first user may give permission for sharing his or her digital wallet in its entirety including all the artifacts included in the digital wallet, for instance, permissions may be granted to use all coupons, gift cards, offers, contacts, etc. included therein. In another example, the first user may grant permissions for different levels such as sharing coupons for only a certain merchant (e.g., only Macy's™ coupons), or only a certain category of coupons for any merchant (e.g., jewelry coupons for any merchant), or only a certain category for a certain merchant (e.g., furniture coupons for Macy's™), or only coupons and rewards cards, or the like. Furthermore, such permissions may be associated with sharing, for example, the permissions may be granted for viewing the artifacts such as coupons, or for viewing and using the artifacts, or for using an artifact based on time and/or location, such as only within the current month, or only for specified locations or areas, etc. In one example, a husband and wife may share their digital wallet and the wife may view or use artifacts included in the shared wallet such as store memberships, discount coupons, contact details of the husband, etc. Similarly, the husband may view artifacts such as receipts shared by the wife such that the husband may reimburse the relevant receipts. In another example, friends may share artifacts such as movie theatre tickets or gift cards with each other.

In block 206, the system may receive the first user's selection of a second user with whom artifact(s) are to be shared. For example, referring to the embodiment of FIG. 1, user 102 may select user 104 for sharing an artifact. It should be noted that in various embodiments the first user may select to share his or her digital wallet artifact(s) with more than one user or recipient. In an embodiment, the one or more users or recipients with whom the artifact(s) are to be shared may be selected from the first user's contact list, which may be displayed on the first user's user device. In various embodiments, chained sharing may be permitted. For example, the first user 102 may permit the second user 104 to re-share the artifact. That is, the second user 104 may be able to, in turn, share the artifact with a third user or more users. In various embodiments, the system may notify the first user as well as all or some of the users with whom an artifact has been shared, that the artifact is being shared with further users or recipients.

In block 208, the system adds the selected artifact(s) ID (identifier or identification) to a database along with selected second user information (and other users' information if applicable) and any specified permissions. For example, with respect to the embodiment of FIG. 1, the artifact sharing service or platform 120 may add an artifact ID of the shared artifact in shared artifacts information 125 of database 118 in an entry associated with the user (e.g., user 104) with whom the artifact is shared.

In block 212, the system notifies the second user about the sharing of the artifact(s) such that the second user may find the shared artifact(s) in his or her user device's digital wallet. In this regard, a notification regarding a shared artifact(s) may be implemented by a message such as an email message, a text, a pop-up window, an audible sound, etc. displayed on the second user's user device.

In block 214, when an artifact is used, the system may notify every user with whom the artifact is shared about its usage, and its entry in the database may be updated accordingly. For example, the database entry may be updated to indicate that the shared artifact was used on a certain date, at a certain time, at a certain location, for a certain amount as applicable, by a certain user, etc.

In various embodiments, after an artifact is used by the first user, or by any other user with whom the artifact was shared, notifications regarding the use of the artifact may be sent to all or some of the users having the shared artifacts in their digital wallets. The notifications may be sent to the users in various ways, for example, via an email, a text, a pop-up window, an audio sound, or the like. In some embodiments, the notification may include information about the use of the artifact, for example, if the artifact is a multi-use artifact, the notification may include information about who used it, when, at which location, etc. In some embodiments, once an artifact is used, the artifact may be marked as used or expired or it may be removed from the users' digital wallets.

It is understood that at least some of method blocks 202-214 may be performed at least in part by one or more electronic processors of a system that is located remotely from a user device. It is also understood that additional method blocks may be performed before, during, or after the steps 202-214 discussed above. For example, the method may include a block wherein each user registers, sets up an account and/or downloads an application from a remote server such as a service provider server for sharing contents of a digital wallet. It is also understood that one or more of the method blocks described herein may be omitted, combined, or performed in a different sequence as desired.

Figure 3A:
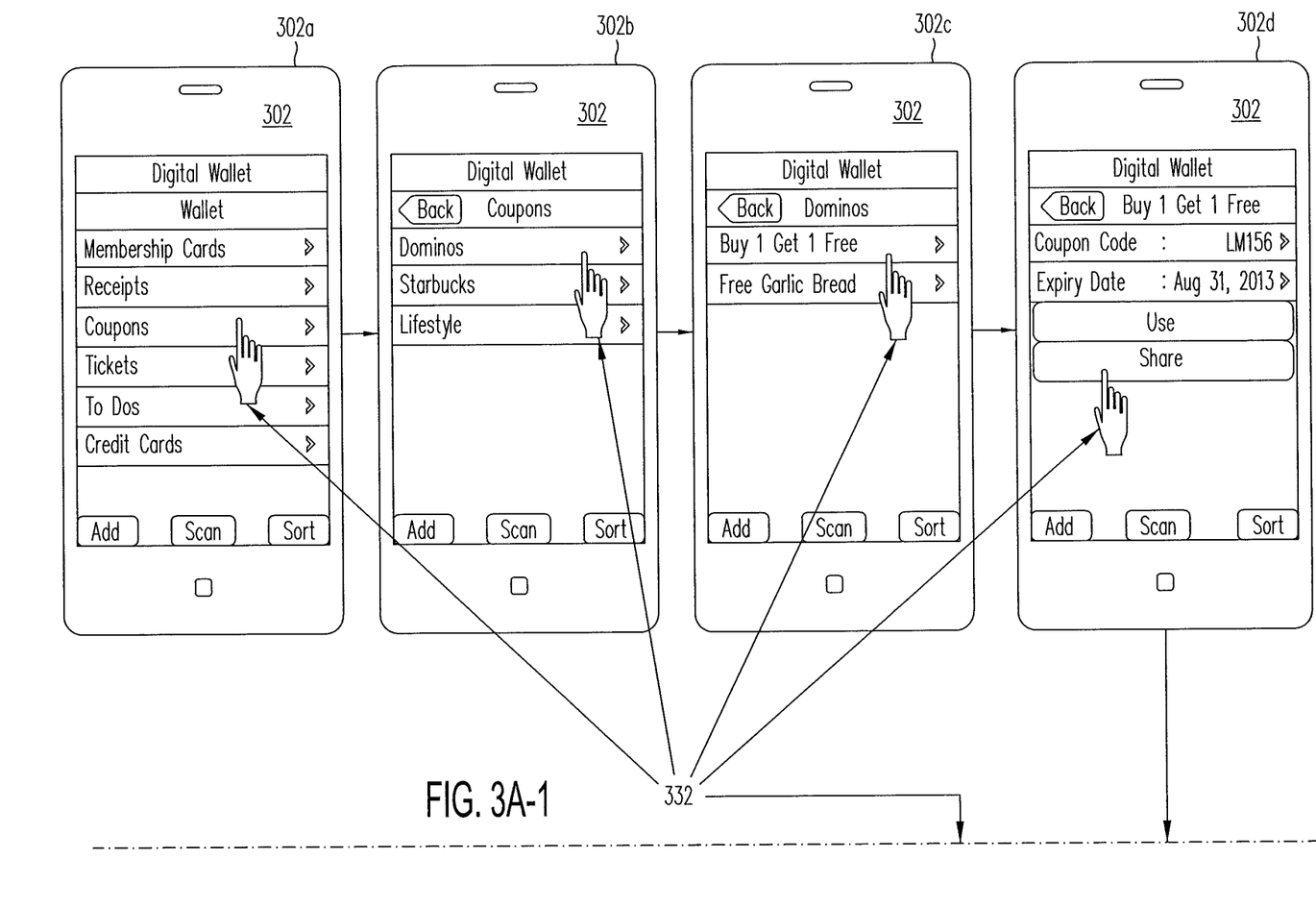
Figures 3A, 3A:
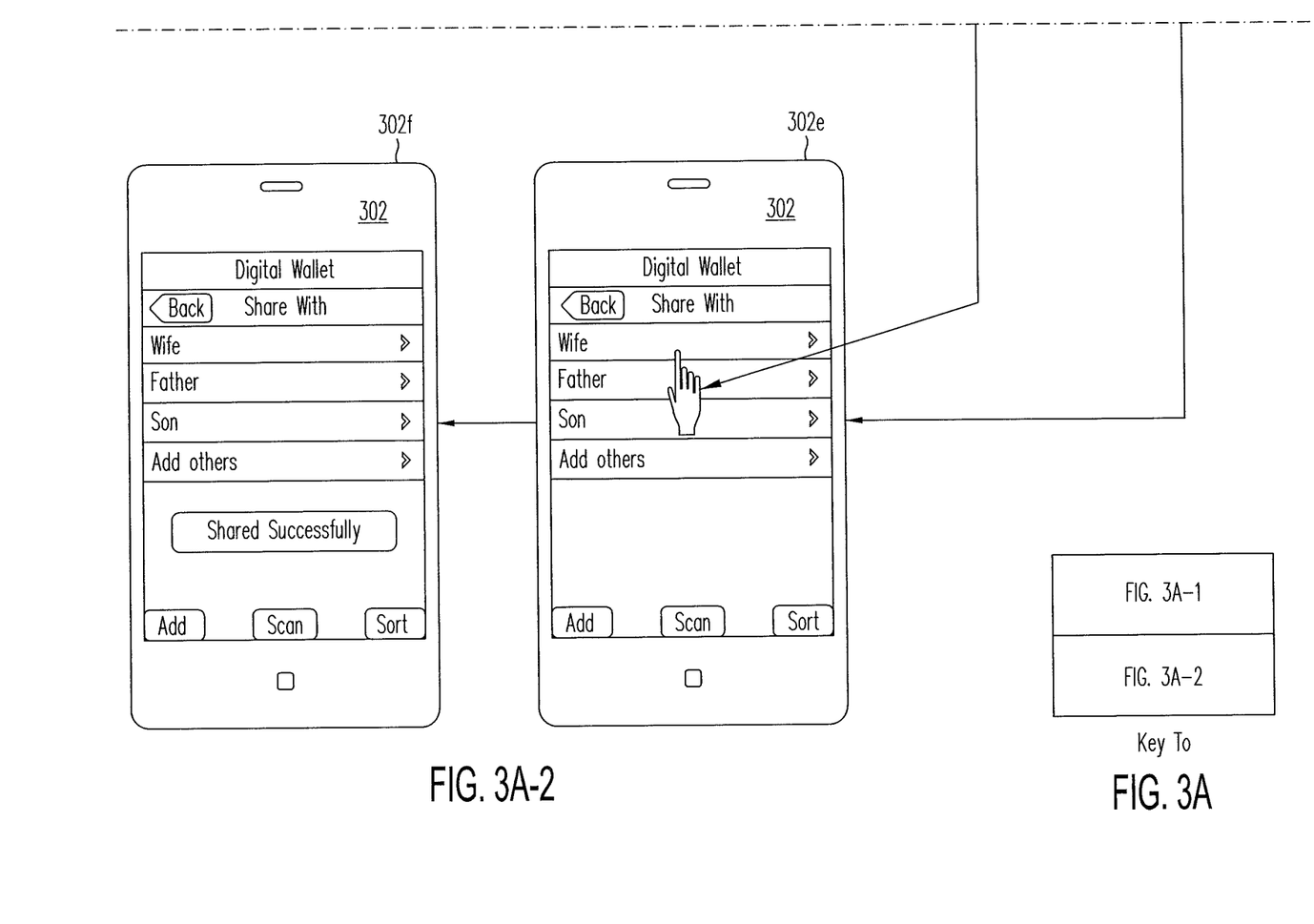

Referring now to FIG. 3A, a diagram illustrates a use case flow from a perspective of a first user device for sharing an artifact of a digital wallet according to an embodiment of the present disclosure. (It should be noted that the use case flow illustrated in the embodiment of FIG. 3A from a perspective of the first user device is shown on two pages, indicated as FIG. 3A-1 and continued in FIG. 3A-2).

In the embodiment illustrated in FIG. 3A (beginning with FIG. 3A-1), the first user, for example, a husband, may be associated with (e.g. owns or uses) a user device 302 having an application for sharing a digital wallet downloaded therein. It should be noted that user device 302 illustrated in the embodiment of FIG. 3A may correspond to the first user device 106 illustrated in the embodiment of FIG. 1.

In this use case, the husband may want to share an artifact (e.g., a Dominos™ coupon) from his digital wallet with a second user, for example, with his wife. First, the husband may select an artifact from a listing of artifacts included in the digital wallet. For example, as illustrated in view 302a of FIG. 3A (beginning with FIG. 3A-1), the digital wallet may include various categories including receipts, coupons, tickets, ToDos, and credit cards. As indicated by pointer 332, the husband may select a category such as the "Coupons" category by using an interface of user device 302.

In view 302b, the husband may select a merchant such as "Dominos™" as indicated by pointer 332. In view 302c, the husband may select a specific coupon for Dominos™ such as "Buy 1 Get 1 Free" as indicated by pointer 332. In view 302d, the husband may select to share the coupon by selecting an interface labeled "Share" on the user device, as indicated by pointer 332. Details of the artifact such as a coupon including for example a coupon code and an expiration date may be associated with the shared artifact. In view 302e (continuing in FIG. 3A-2), the husband selects a second user (or as many users as desired) with whom to share the coupon. For example, the husband may select "Wife" (as indicated by pointer 332) from a list of contacts displayed on user device 302. Finally, in view 302f, user device 302 displays that the artifact was "Shared Successfully." It should be noted that the various interfaces for making selections on the user device may have any label, tag, name, indicia, etc. as appropriate.

Once the artifact has been successfully shared with a second user, the second user may view and/or use the shared artifact as will be described in more detail below with respect to the embodiment of FIG. 3B.

Figure 3B:
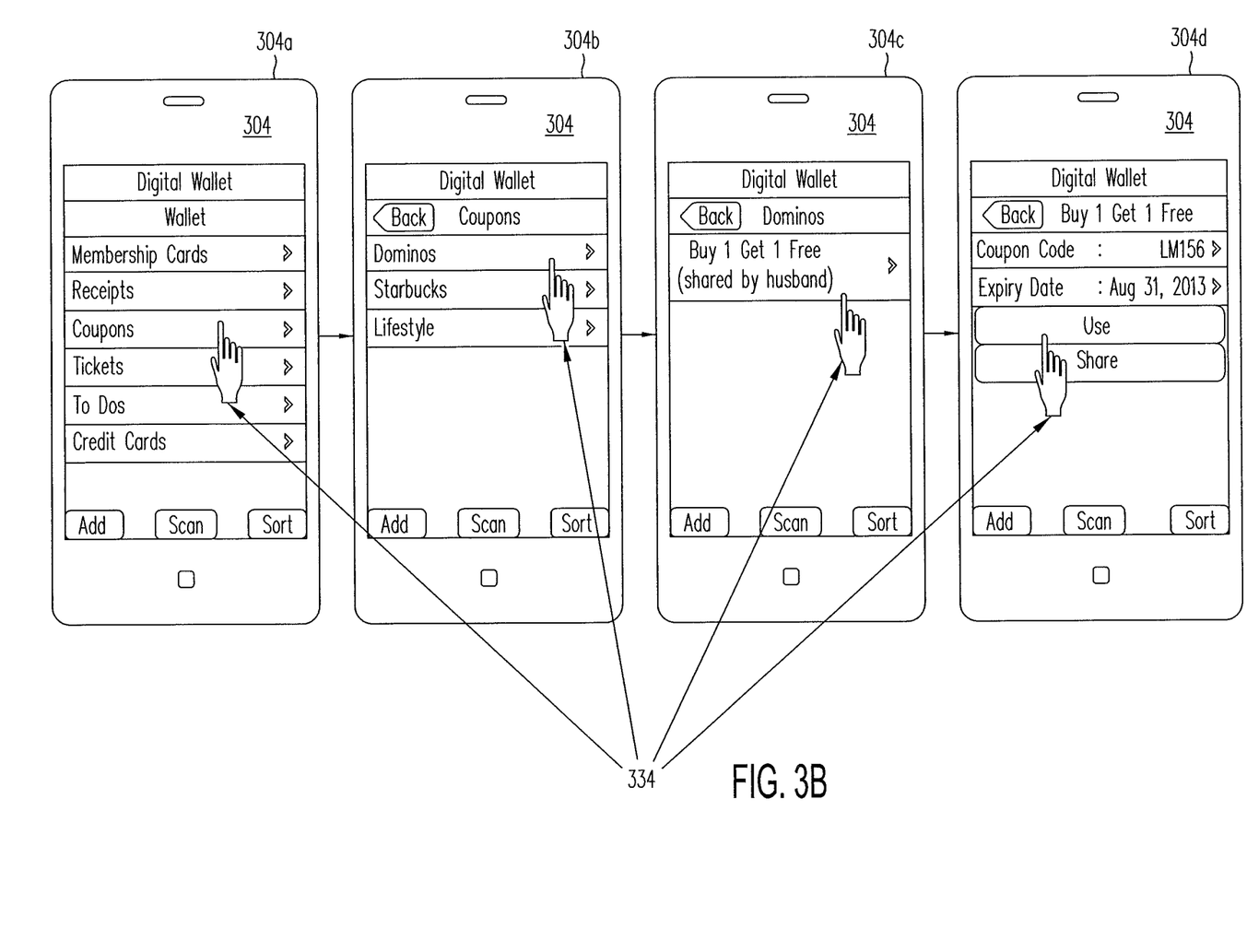
FIG. 3B is a diagram illustrating a use case flow from a perspective of a second user device for using a shared artifact according to an embodiment of the present disclosure.

Referring now to FIG. 3B, a diagram illustrates a use case flow from a perspective of a second user device for using a shared artifact according to an embodiment of the present disclosure.

In the embodiment illustrated in FIG. 3B, the second user, for example, a wife, may be associated with (e.g. owns or uses) a user device 304 having an application for sharing a digital wallet downloaded therein. It should be noted that user device 304 illustrated in the embodiment of FIG. 3B may correspond to the second user device 108 illustrated in the embodiment of FIG. 1.

In this use case, as described above with respect to the embodiment of FIG. 3A, a first user, e.g., the husband has shared an artifact (e.g., a Dominos™ coupon) from his digital wallet with the second user, e.g., the wife. In various embodiments, a notification may be sent to the second user that a digital wallet artifact has been shared, for example, a communication such as an email, a text, a pop-up window, an audible sound, etc. may be sent to the second user device 304 to apprise or notify the second user about the shared artifact. The notification may include details about the shared artifact, for example, a text or email communication may include the category, type, expiration, etc. of the shared artifact. In this use case example, the notification may include details such as the artifact being a coupon for Dominos™ as well as the coupon code, expiration date, etc. In various embodiments, the first user may permit the second user to further share the artifact, for example, the husband may permit the wife to share the Dominos™ coupon with other users such as the children, or other friends or family.

As illustrated in view 304a of FIG. 3B, the digital wallet of second user device 304 associated with the wife may include various categories including membership cards, receipts, coupons, tickets, ToDos, and credit cards. As indicated by pointer 334, the wife may select a category such as the "Coupons" category by using an interface of user device 304.

In view 304b, the wife may select a merchant such as "Dominos™" as indicated by pointer 334. In view 304c, the wife may select the specific coupon for Dominos™ such as "Buy 1 Get 1 Free" as indicated by pointer 334. In view 304d, the wife may view details about the shared coupon including a coupon code and an expiration date. Also, in this view 304d, the wife may select to use the coupon by selecting an interface labeled "Use" on user device 304, as indicated by pointer 334. It should be noted that the various interfaces for making selections on the user device may have any label, tag, name, indicia, etc. as appropriate.

According to one or more embodiments, the sharing of digital wallets may allow improved flexibility to users or consumers. There may be many use cases in which sharing of digital wallets may be advantageous. For example, as illustrated in the use case described above with respect to FIGS. 3A and 3B, a husband can share his digital wallet with one or more other users such as his wife and children, and give them access to custom parts of the digital wallet. Also, a user may specify certain permissions for sharing of the digital wallet, for example, the user may specify the time, location, etc. for which access has been given. This way, the user, for example the husband, may have flexibility for managing the contents or artifacts included in the digital wallet so that, for instance, the husband may take care of the expenses of the family.

In another example, friends may share their receipts of common expenses with each other such that the system may intelligently determine and notify each person how much one owes to another. In yet another example, a sales manager may share all his contacts with employees in a simple manner, for example, just by clicking on the appropriate interfaces implemented for sharing artifacts. In a further example, objects or things such as shopping carts may be shared so that if two or more users want to buy the same items, they only have to select the items once, not each time or separately. That is, the items may already be present in the shared shopping cart for the users. In another example, a parent may share his or her entire digital wallet or a part of the digital wallet with a babysitter only during the babysitting time. In an embodiment, the sharing time may be specified, for example, between 6 PM and 10 PM. In another example, users may share air miles with each other, for example, in case the air miles are expiring.

Advantageously, a sharing platform according to one or more embodiments may enable users to make extensive use of their digital wallets and may also increase the number of users for the digital wallet.

Figure 4:
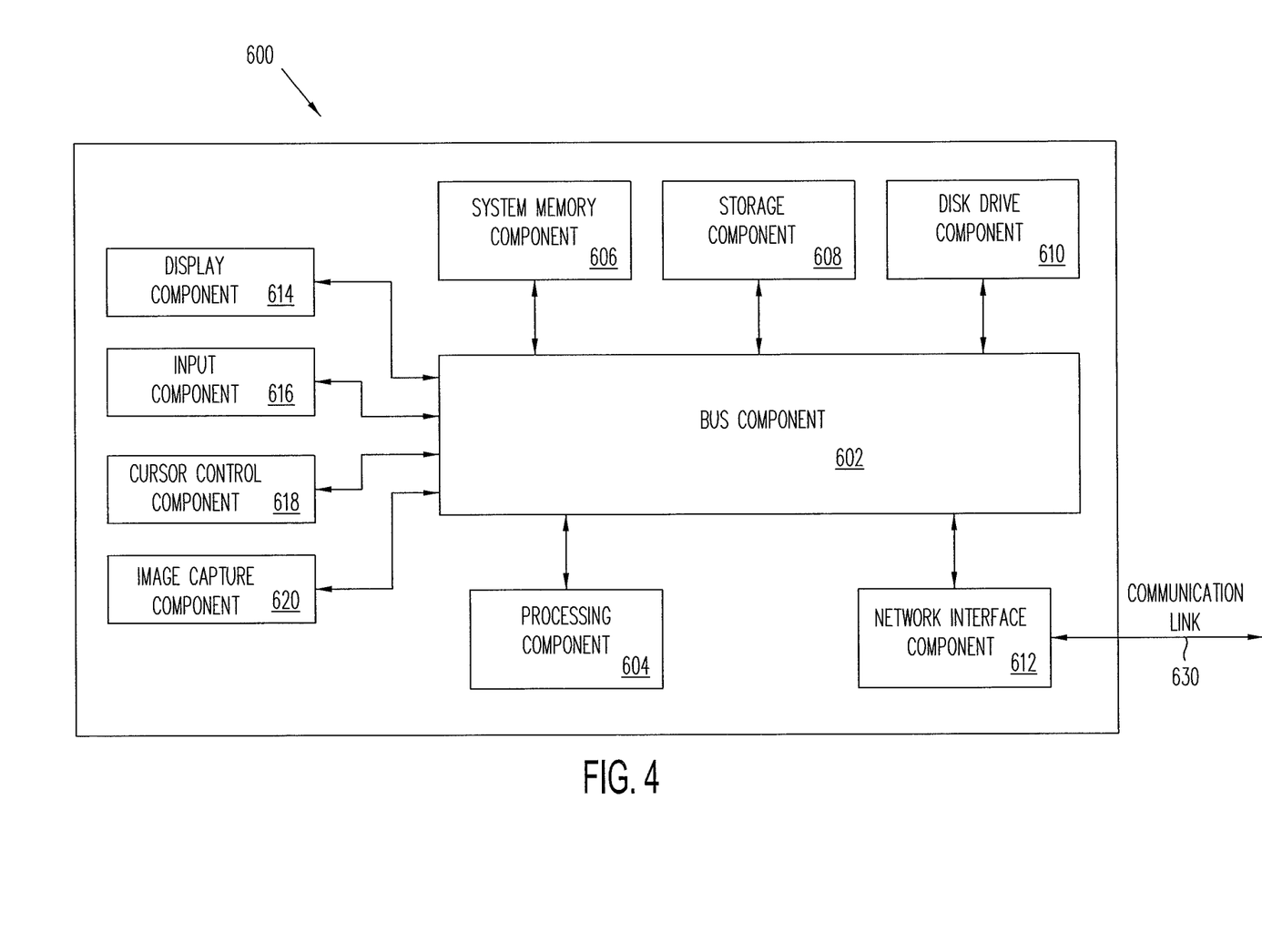
FIG. 4 is a block diagram of a computer system suitable for implementing various methods and devices described according to one or more embodiments of the present disclosure.

FIG. 4 is a block diagram of a computer system 600 suitable for implementing various methods and devices described herein, for example, the various method steps of the method illustrated in the embodiment of FIG. 2. In various implementations, the devices capable of performing the steps may comprise a network communications device (e.g., mobile cellular phone, laptop, personal computer, tablet, wearable computing device, etc.), a network computing device (e.g., a network server, a computer processor, an electronic communications interface, etc.), or another suitable device. Accordingly, it should be appreciated that the devices capable of implementing the method illustrated in the embodiment of FIG. 2 may be implemented as the computer system 600 in a manner as follows.

In accordance with various embodiments of the present disclosure, the computer system 600, such as a network server or a mobile communications device, includes a bus component 602 or other communication mechanisms for communicating information, which interconnects subsystems and components, such as a computer processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., cathode ray tube (CRT) or liquid crystal display (LCD)), input component 616 (e.g., keyboard), cursor control component 618 (e.g., mouse or trackball), and image capture component 620 (e.g., analog or digital camera). In one implementation, disk drive component 610 may comprise a database having one or more disk drive components.

In accordance with embodiments of the present disclosure, computer system 600 performs specific operations by the processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of (or in combination with) software instructions to implement the present disclosure.

Logic may be encoded in a computer readable medium, which may refer to any medium that participates in providing instructions to the processor 604 for execution. Such a medium may take many forms, including but not limited to, non-volatile media and volatile media. In one embodiment, the computer readable medium is non-transitory. In various implementations, non-volatile media includes optical or magnetic disks, such as disk drive component 610, and volatile media includes dynamic memory, such as system memory component 606. In one aspect, data and information related to execution instructions may be transmitted to computer system 600 via a transmission media, such as in the form of acoustic or light waves, including those generated during radio wave and infrared data communications. In various implementations, transmission media may include coaxial cables, copper wire, and fiber optics, including wires that comprise bus 602.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 630 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 630 and communication interface 612. Received program code may be executed by computer processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figures 5, 6:
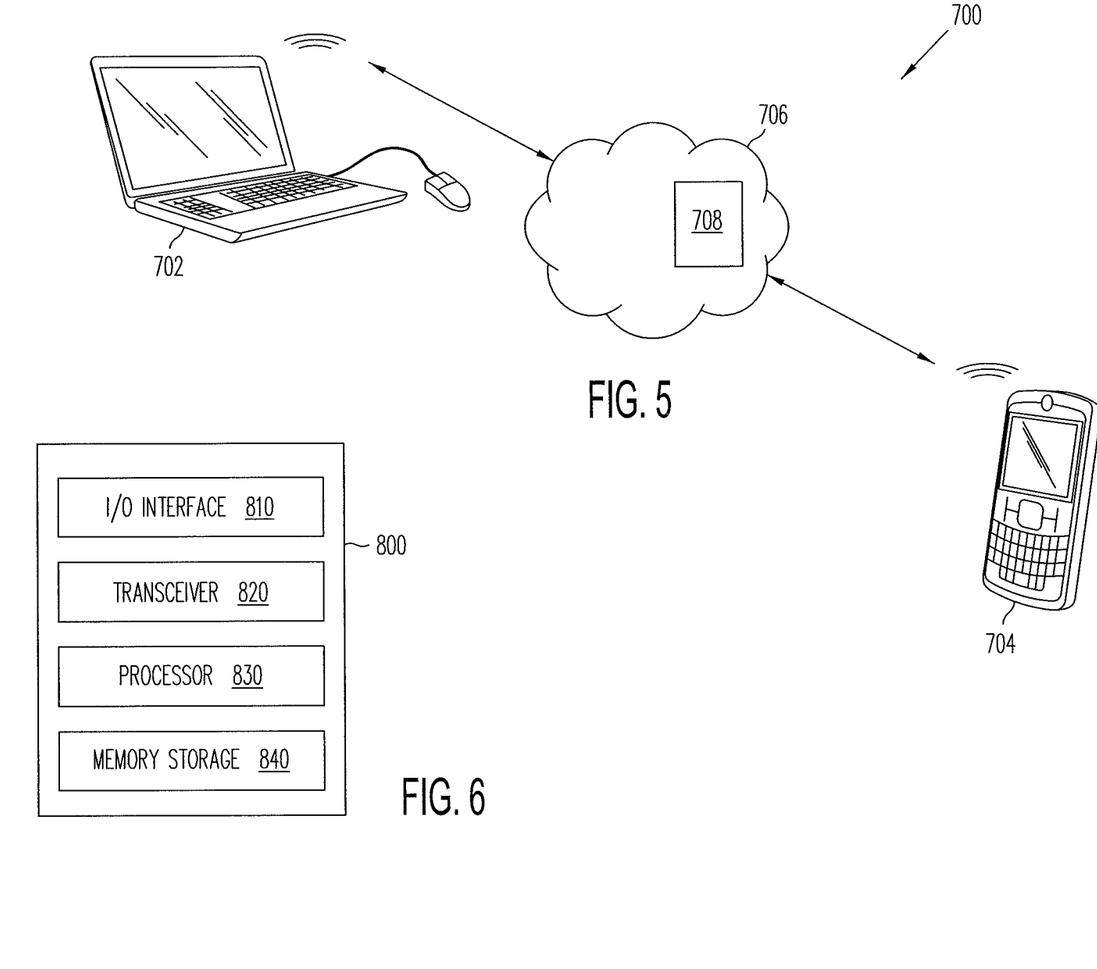
FIG. 5 is a simplified example of a cloud-based computing architecture according to various aspects of the present disclosure.
FIG. 6 is a simplified block diagram of an electronic system for implementing various methods and devices described according to various aspects of the present disclosure.

FIG. 5 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704, which is configured to run software to provide an application with functionalities described above with reference to FIGS. 1-3.

The mobile device 704 is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing and caching may be performed by the cloud-based resources 708. However, other divisions of responsibility are also possible in various embodiments.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, a merchant or another user may access resources 708 from any number of suitable mobile or non-mobile devices. Furthermore, the cloud-based resources 708 may accommodate many merchants and users in various embodiments.

FIG. 6 is a simplified block diagram of an electronic system 800 for facilitating electronic commerce. For example, the electronic system 800 may be used by a third party payment provider to carry out the steps for enabling sharing of a digital wallet discussed herein. In some embodiments, the electronic system 800 may include one or more computer servers operable to perform the method illustrated in the embodiment of FIG. 2.

The electronic system 800 includes an input/output interface module 810. The interface module 810 is operable to receive an input from an external entity and communicate an output to the external entity. The external entity may include a merchant or a consumer. In an embodiment, the input/output interface module 810 includes a visual display unit. The input/output interface module 810 may also include physical and/or virtual buttons, keyboards, mouse, track balls, speakers, microphones, light-sensors, light-emitting diodes (LEDs), communications ports (such as USB or HDMI ports), joy-sticks, image-capture devices (for example cameras), etc.

The electronic system 800 includes a transceiver module 820. The transceiver module 820 contains various electronic circuitry components configured to conduct telecommunications with one or more external devices. The electronic circuitry components allow the transceiver module 820 to conduct telecommunications in one or more of the wired or wireless telecommunications protocols, including communications protocols such as IEEE 802.11 (WiFi), IEEE 802.15 (Bluetooth), GSM, CDMA, LTE, WIMAX, DLNA, HDMI, etc. In some embodiments, the transceiver module 820 includes antennas, filters, low-noise amplifiers, digital-to-analog (DAC) converters, analog-to-digital (ADC) converters, and transceivers. The transceiver module 820 may further include circuitry components such as mixers, amplifiers, oscillators, phase-locked loops (PLLs), and/or filters. Some of these electronic circuitry components may be integrated into a single discrete device or an integrated circuit (IC) chip.

The electronic system 800 also includes a computer processor module 830 that is operable to execute computer instructions. The computer processor module 830 may contain one or more central processing units (CPUs), graphics processing units (GPUs), or digital signal processors (DSPs), which may each be implemented using various digital circuit blocks (including logic gates such as AND, OR, NAND, NOR, XOR gates, etc) along with certain software code.

The electronic system 800 includes a memory storage module 840. The memory storage module 840 may contain various forms of digital memory, such as hard disks, FLASH, SRAM, DRAM, ROM, EPROM, memory chips or cartridges, etc. Computer programming code may be permanently or temporarily stored in the memory storage module 840, for example. The processor module 830 may be used to execute the computer programming code stored in the memory storage module 840.

The memory storage module 840 also contains a program module that is configured to facilitate the electronic transactions according to the present disclosure. For example, the program module operates to provide actions to enable sharing of one or more artifacts included in a digital wallet with one or more users.

In some embodiments, the electronic system 800 may also be implemented on a portable electronic device such as a mobile telephone or a computer tablet.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    a non-transitory memory storing instructions; and
    one or more hardware processors coupled to the non-transitory memory and configured to execute the instructions to cause the system to perform operations comprising:
        receiving, from a first application hosted by a first user device of a first user, a first indication for sharing a digital artifact with a second user;
        in response to receiving the first indication, causing the digital artifact to be accessible, at a same time, by the first application and by a second application hosted by a second user device of the second user;
        receiving, from the second application, a second indication for sharing the digital artifact with a third user;
        in response to receiving the second indication, causing the digital artifact to be accessible, at the same time, by the first application, the second application, and a third application hosted by a third user device of the third user;
        detecting a use of the digital artifact by one of the first, second, or third application, at a merchant;
        in response to the detecting, causing the digital artifact to be inaccessible by at least another one of the first, second, or third application; and
        sending a used artifact notification to the at least the other one of the first, second, or third application indicating that the digital artifact has been used.

2. The system of claim 1, wherein the operations further comprise:
    receiving, via the first application, a first selection of the digital artifact from a plurality of digital artifacts accessible by the first application;
    in response to the receiving the first selection, presenting, on an interface of the first application, a list of users associated with the first user; and
    receiving, via the interface of the first application, a second selection of the second user among the list of users.

3. The system of claim 1, wherein the operations further comprise:
    transmitting a share notification to the second user device, the share notification indicating that the digital artifact is shared between the first user and the second user.

4. The system of claim 1, wherein the operations further comprise receiving, from the first application, one or more permissions for allowing the second user to re-share the digital artifact, and wherein the causing the digital artifact to be accessible by the third application is based on the one or more permissions.

5. The system of claim 1, wherein the digital artifact comprises at least one of a coupon, reward points, or a gift card.

6. The system of claim 1, wherein the operations further comprise:
    storing a record associated with the digital artifact in a database accessible by the first, second, and third application, wherein the record indicates that the digital artifact is shared among the first, second, and third users; and
    in response to the detecting the use of the digital artifact, removing the record from the database.

7. The system of claim 1, wherein the operations further comprise:
    receiving, from the third application, a request for presenting one or more digital artifacts accessible by the third user;
    in response to receiving the request, determining that the digital artifact associated with the first user has been shared with the third user based on accessing a database; and
    in response to the determining that the digital artifact has been shared with the third user, presenting the digital artifact on an interface of the third application.

8. The system of claim 1, wherein the operations further comprise:
   determining that the digital artifact has been further shared by the second user with the third user; and
   in response to the determining that the digital artifact has been further shared by the second user with the third user, sending a shared artifact notification to the first application indicating that the digital artifact has been shared with the third user.

9. A method for managing shared resources, the method comprising:
   receiving, by one or more hardware processors from a first application hosted by a first user device of a first user, a first request for sharing a digital artifact with a second user;
   in response to receiving the first request, causing, by the one or more hardware processors, the digital artifact to be accessible, substantially simultaneously, by the first application and by a second application hosted by a second user device of the second user;
   receiving, by the one or more hardware processors from the second application, a second request for sharing the digital artifact with a third user;
   in response to receiving the second request, causing, by the one or more hardware processors, the digital artifact to be accessible, substantially simultaneously, by the first application, the second application, and a third application hosted by a third user device of the third user;
   detecting, by the one or more hardware processors, a user of the digital artifact by one of the first, second, or third application, at a merchant;
   in response to the detecting, causing, by the one or more hardware processors the digital artifact to be inaccessible by at least another one of the first, second, or third application; and
   sending, by the one or more hardware processors, a used artifact notification to the at least the other one of the first second, or third application indicating that the digital artifact has been used.

10. The method of claim 9, further comprising:
    receiving, via an interface of the first application, a first selection of the digital artifact from a plurality of digital artifacts accessible by the first application;
    in response to the receiving the first selection, presenting, on the interface of the first application, a list of users associated with the first user; and
    receiving, via the interface of the first application, a second selection of the second user among the list of users.

11. The method of claim 10, further comprising:
    transmitting a share notification to the second user device, the share notification indicating that the digital artifact is shared between the first user and the second user.

12. The method of claim 10, further comprising receiving, from the first application, one or more permissions for allowing the second user to re-share the digital artifact, wherein the causing the digital artifact to be accessible by the third application is based on the one or more permissions.

13. The method of claim 9, further comprising:
    storing a record associated with the digital artifact in a database accessible by the first, second, and third application, wherein the record indicates that the digital artifact is shared among the first, second, and third users; and
    in response to the detecting the use of the digital artifact, removing the record from the database.

14. The method of claim 9, further comprising:
    receiving, from the third application, a request for presenting one or more digital artifacts accessible by the third user;
    in response to receiving the request, determining that the digital artifact associated with the first user has been shared with the third user; and
    in response to the determining that the digital artifact has been shared with the third user, presenting the digital artifact on an interface of the third application.

15. The method of claim 9, further comprising:
    determining that the digital artifact has been further shared by the second user with the third user; and
    in response to determining that the digital artifact has been further shared by the second user with the third user, sending a shared artifact notification to the first application indicating that the digital artifact has been shared with the third user.

16. A non-transitory machine-readable medium having stored thereon machine-readable instructions executable to cause a machine to perform operations comprising:
    receiving, from a first application hosted by a first user device of a first user, a first indication for sharing a digital artifact with a second user,
    in response to receiving the first indication, causing the digital artifact to be accessible by the first application and by a second application hosted by a second user device of the second user;
    receiving, from the second application, a second indication for sharing the digital artifact with a third user;
    in response to receiving the second indication, causing the digital artifact to be accessible by the first application, the second application, and a third application hosted by a third user device of the third user;
    detecting a use of the digital artifact by one of the first second, or third application, at a merchant;
    in response to the detecting, causing the digital artifact to be inaccessible by at least another one of the first, second, or third application; and
    sending a used artifact notification to the at least the other one of the first, second, or third application indicating that the digital artifact has been used.

17. The non-transitory machine-readable medium of claim 16, wherein the operations further comprise:
    receiving, via an interface of the first application, a first selection of the digital artifact from a plurality of digital artifacts accessible by the first application; and
    in response to the receiving the first selection, presenting, on the interface, a list of users associated with the first user; and
    receiving, via the interface of the first application, a second selection of the second user among the list of users.

18. The non-transitory machine-readable medium of claim 16, wherein managing the digital artifact comprises:
    storing a record associated with the digital artifact in a database accessible by the first, second, and third application, wherein the record indicates the digital artifact is shared among the first, second, and third users; and
    in response to the detecting the use of the digital artifact, removing the record from the database.

19. The non-transitory machine-readable medium of claim 16, wherein the operations further comprise:

receiving, from the third application, a request for presenting one or more digital artifacts accessible by the third user;

in response to receiving the request, determining that the digital artifact associated with the first user has been shared with the third user based on accessing a database; and in response to the determining that the digital artifact has been shared with the third user, presenting the digital artifact on an interface of the third application.

20. The non-transitory machine-readable medium of claim 16, wherein the operations further comprise receiving, from the first application, one or more permissions for allowing the second user to re-share the digital artifact, and wherein the causing the digital artifact to be accessible by the first application, the second application, and the third application is based on the one or more permissions.

* * * * *